(12) United States Patent
Byun

(10) Patent No.: US 11,163,696 B2
(45) Date of Patent: Nov. 2, 2021

(54) CONTROLLER, MEMORY SYSTEM AND OPERATING METHOD THEREOF FOR CONTROLLING A NON-VOLATILE MEMORY DEVICE DURING A SYNC-UP OPERATION

(71) Applicant: SK hynix Inc., Gyeonggi-do (KR)

(72) Inventor: Eu Joon Byun, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 101 days.

(21) Appl. No.: 16/595,013

(22) Filed: Oct. 7, 2019

(65) Prior Publication Data

US 2020/0310983 A1 Oct. 1, 2020

(30) Foreign Application Priority Data

Mar. 27, 2019 (KR) ........................ 10-2019-0035143

(51) Int. Cl.
*G06F 12/00* (2006.01)
*G06F 12/121* (2016.01)
(Continued)

(52) U.S. Cl.
CPC ........ *G06F 12/121* (2013.01); *G06F 12/0253* (2013.01); *G06F 12/10* (2013.01); *G06F 2212/1008* (2013.01)

(58) Field of Classification Search
CPC .... G06F 12/121; G06F 12/0253; G06F 12/10; G06F 2212/1008; G06F 2212/7205;
(Continued)

(56) References Cited

U.S. PATENT DOCUMENTS

2010/0211737 A1* 8/2010 Flynn ................. G06F 12/0246
 711/114
2018/0121121 A1* 5/2018 Mehra ................. G06F 3/0604

FOREIGN PATENT DOCUMENTS

KR 10-2018-0016679 A 2/2013
KR 1020140057454 5/2014
(Continued)

OTHER PUBLICATIONS

Jeong, W. et al., Improving Flash Storage Performance by Caching Address Mapping Table in Host Memory, HotStorage '17, Jul. 10-11, 2017, 9th USENIX Workshop, Santa Clara, CA.

*Primary Examiner* — Mardochee Chery
(74) *Attorney, Agent, or Firm* — IP & T Group LLP

(57) ABSTRACT

Various embodiments generally relate to a semiconductor device, and more particularly, to a controller, a memory system and an operating method thereof. In an embodiment of the present disclosure, a controller for controlling a nonvolatile memory device may perform a sync-up operation of transmitting a logical-to-physical (L2P) map segment to a host to update the L2P map segment stored in a host memory included in the host when a map data changing event occurs, register the L2P map segment transmitted to the host and time information at which the sync-up operation is performed in a sync-up management list, calculate a sync-up period based on the time information, and perform the sync-up operation on an L2P map segment having a sync-up period greater than a threshold time, among L2P map segments registered in the sync-up management list.

17 Claims, 9 Drawing Sheets

(51) Int. Cl.
*G06F 12/02* (2006.01)
*G06F 12/10* (2016.01)

(58) Field of Classification Search
CPC ..... G06F 2212/7201; G06F 2212/1044; G06F 12/0246; G06F 12/1009
USPC ........................................................ 711/133
See application file for complete search history.

(56) References Cited

FOREIGN PATENT DOCUMENTS

KR  1020160148952  12/2016
KR  1020170035155   3/2017

* cited by examiner

CONTROLLER, MEMORY SYSTEM AND OPERATING METHOD THEREOF FOR CONTROLLING A NON-VOLATILE MEMORY DEVICE DURING A SYNC-UP OPERATION

CROSS-REFERENCES TO RELATED APPLICATION

The present application claims priority under 35 U.S.C. § 119(a) to Korean application number 10-2019-0035143, filed on Mar. 27, 2019, which is incorporated herein by reference in its entirety as set forth in full.

BACKGROUND

1. Technical Field

Various embodiments generally relate to a semiconductor device, and more particularly, to a controller, a memory system and an operating method thereof.

2. Related Art

Recently, the paradigm for the computing environment has changed to the ubiquitous computing environment in which computer systems can be used anytime and anywhere. Therefore, the use of portable electronic devices such as a mobile phone, digital camera and notebook computer has rapidly increased. Such a portable electronic device generally uses a memory system using a memory device. The memory system is used to store data used in the portable electronic device.

Since the memory system using a memory device has no mechanical driver, the data storage device has excellent stability and durability, exhibits high information access speed, and has low power consumption. Examples of the memory system having such advantages include a universal serial bus (USB) memory device, a memory card having various interfaces, a universal flash storage (UFS) device, and a solid state drive (SSD).

SUMMARY

In one embodiment of the present disclosure, a controller for controlling a nonvolatile memory device may perform a sync-up operation of transmitting an L2P map segment to a host to update the L2P map segment stored in a host memory included in the host when a map data changing event occurs, register the L2P map segment transmitted to the host and time information at which the sync-up operation is performed in a sync-up management list, calculate a sync-up period based on the time information, and perform the sync-up operation on an L2P map segment having a sync-up period greater than a threshold time among L2P map segments registered in the sync-up management list.

In one embodiment of the present disclosure, a memory system may include: a nonvolatile memory device; and a controller for controlling the nonvolatile memory device, wherein the nonvolatile memory device may store a plurality of L2P map segments each including a plurality of pieces of L2P map data, and wherein the controller may perform a sync-up operation of transmitting an L2P map segment to a host to update the L2P map segment stored in a host memory included in the host when a map data changing event occurs, register the L2P map segment transmitted to the host and time information at which the sync-up operation is performed in a sync-up management list, calculate a sync-up period based on the time information, and perform the sync-up operation on an L2P map segment having the sync-up period greater than a threshold time among L2P map segments registered in the sync-up management list.

In one embodiment of the present disclosure, an operation method of a memory system including a nonvolatile memory device and a controller for controlling the nonvolatile memory device, wherein the method may include storing, by the nonvolatile memory device, a plurality of logical-to-physical (L2P) map segments each including a plurality of pieces of L2P map data; performing, by the controller, a sync-up operation of transmitting an L2P map segment to a host to update the L2P map segment stored in a host memory included in the host when a map data changing event occurs; registering, by the controller, the L2P map segment transmitted to the host and time information at which the sync-up operation is performed in a sync-up management list; calculating, by the controller, a sync-up period based on the time information; and performing, by the controller, the sync-up operation on an L2P map segment having the sync-up period greater than a threshold time, among L2P map segments registered in the sync-up management list.

BRIEF DESCRIPTION OF THE DRAWINGS

Features, aspects and embodiments are described in conjunction with the attached drawings, in which.

DETAILED DESCRIPTION

Hereinafter, a semiconductor apparatus according to the present disclosure will be described below with reference to the accompanying drawings through various embodiments.

Figure 1:
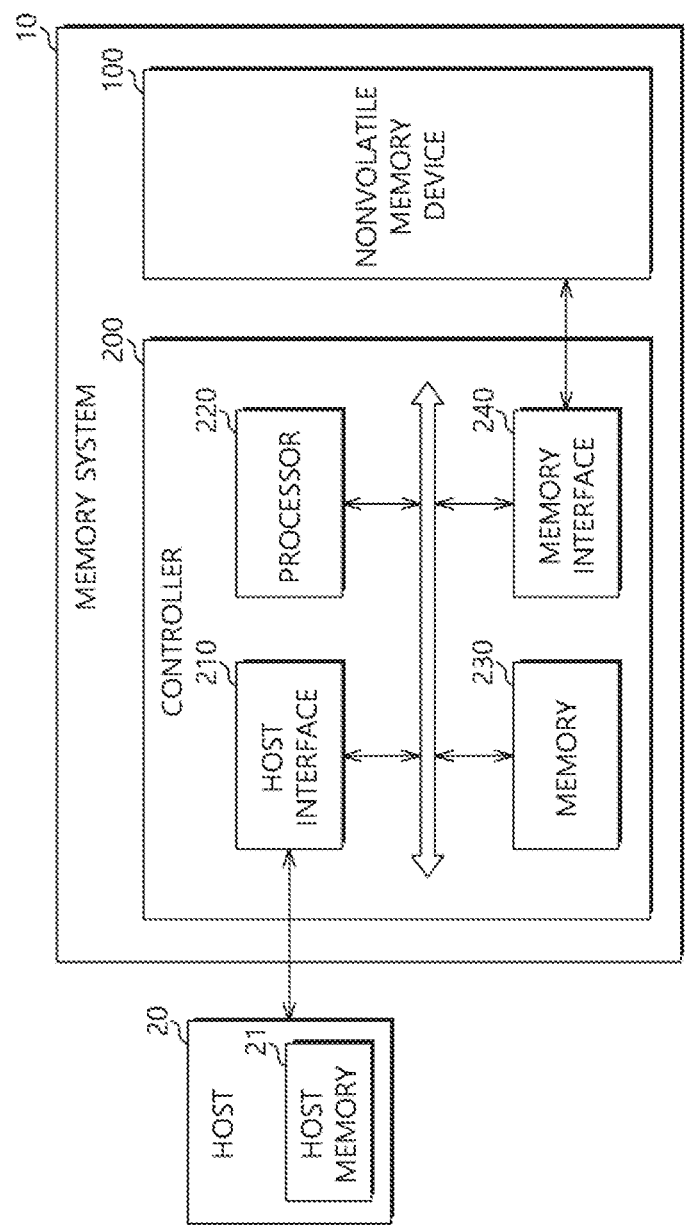
FIG. 1 is a diagram illustrating a memory system in accordance with an embodiment of the present disclosure.

FIG. 1 is a diagram illustrating a memory system 10 in accordance with an embodiment of the present disclosure. Referring to FIG. 1, the memory system 10 may store data to be accessed by a host 20 such as a mobile phone, an MP3 player, a laptop computer, a desktop computer, a game player, a television (TV), an in-vehicle infotainment system, and the like. The memory system 10 may be coupled to the host 20 through a host channel.

The memory system 10 may form various types of storage devices according to an interface protocol coupled to the host 20. For example, the memory system 10 may be configured of any one of various types of storage devices, such as a solid state drive (SSD), a multimedia card in the forms of MMC, eMMC, RS-MMC and micro-MMC, a secure digital card in the forms of SD, mini-SD and micro-SD, a universal serial bus (USB) storage device, a universal flash storage (UFS) device, a storage device of the type of a personal computer memory card international association (PCMCIA) card, a storage device of the type of a peripheral component interconnection (PCI), a storage device of the type of a PCI-express (PCI-E), a compact flash (CF) card, a smart media card, a memory stick, and the like.

The memory system 10 may be implemented as any one among various types of packages such as a package on package (POP), a system in package (SIP), a system on chip (SOC), a multi-chip package (MCP), a chip on board (COB), a wafer-level fabricated package (WFP), and a wafer-level stack package (WSP).

The memory system 10 may include a nonvolatile memory device 100 and a controller 200.

The nonvolatile memory device 100 may operate as a storage medium of the memory system 10. Depending on the types of memory cells configuring the nonvolatile memory device 100, the nonvolatile memory device 100 may be implemented as one among various nonvolatile memory devices such as a NAND flash memory device, a NOR flash memory device, a ferroelectric random access memory (FRAM) using a ferroelectric capacitor, a magnetic random access memory (MRAM) using a tunneling magneto-resistive (TMR) layer, a phase-change random access memory (PRAM) using a chalcogenide alloy, a resistive random access memory (ReRAM) using a transition metal compound, and so forth.

Although FIG. 1 exemplifies the memory system 10 including a single nonvolatile memory device 100 for clarity, the memory system 10 may include a plurality of nonvolatile memory devices.

The nonvolatile memory device 100 may include a memory cell array (not shown) including a plurality of memory cells arranged at cross points between a plurality of word lines (not shown) and a plurality of bit lines (not shown). The memory cell array may include a plurality of memory blocks each including a plurality of pages.

For example, each of the memory cells in the memory cell array may be a single level cell (SLC) capable of storing 1-bit data or a multi level cell (MLC) capable of storing 2-bit or greater data. A memory cell capable of storing 2-bit data may be referred to as a multi-level cell (MLC), a memory cell capable of storing 3-bit data may be referred to as a triple level cell (TLC), and a memory cell capable of storing 4-bit data may be referred to as a quadruple level cell (QLC). However, for clarity, the memory cells in which the 2-bit or greater data are to be stored may be collectively referred to as the MLC in the description.

The memory cell array may include at least one of the SLC and the MLC. The memory cell array may include memory cells arranged in a two-dimensional (e.g., horizontal) structure or memory cells arranged in a 3D vertical structure.

The controller 200 may control general operations of the memory system 10 by driving firmware or software loaded in the memory 230. The controller 200 may decode and drive instructions or algorithms of a code type, such as firmware or software. The controller 200 may be implemented as hardware or combination of hardware and software. Although not illustrated in FIG. 1, the controller 200 may further include an error correction code (ECC) engine configured to generate a parity by ECC-encoding write data provided from the host 20 and to ECC-decode read data read from the nonvolatile memory device 100 using the parity.

The controller 200 may include a host interface 210, a processor 220, a memory 230, and a memory interface 240.

The host interface 210 may interface the memory system 10 with the host 20 according to a protocol of the host 20. For example, the host interface 210 may communicate with the host 20 through any one among a universal serial bus (USB) protocol, a universal flash storage (UFS) protocol, a multimedia card (MMC) protocol, a parallel advanced technology attachment (PATA) protocol, a serial advanced technology attachment (SATA) protocol, a small computer system interface (SCSI) protocol, a serial attached SCSI (SAS) protocol, a peripheral component interconnection (PCI) protocol, and a PCI express (PCI-E) protocol.

The processor 220 may include a micro control unit (MCU) or a central processing unit (CPU). The processor 220 may process requests transmitted from the host 20. To process the requests transmitted from the host 20, the processor 220 may drive a code-based instruction or algorithm (for example, firmware) loaded into the memory 230 and control the nonvolatile memory device 100 and internal function blocks such as the host interface 210, the memory 230 and the memory interface 240.

The processor 220 may generate control signals for controlling operations of the nonvolatile memory device 100 based on the requests transmitted from the host 20, and may provide the generated control signals to the nonvolatile memory device 100 through the memory interface 240.

When the nonvolatile memory device 100 is implemented as a flash memory device, the processor 220 may drive software referred to as a flash translation layer (FTL) in order to control a unique operation of the nonvolatile memory device 100 and provide device compatibility to the host 20. As the FTL is driven, the host 20 may recognize and use the memory system 10 as a general storage device such as a hard disk.

The memory 230 may be configured of a read only memory (ROM) and a random access memory (RAM) such as a dynamic random access memory (DRAM) or a static random access memory (SRAM). The memory 230 may store the firmware to be driven by the processor 220. The memory 230 may also store data (for example, meta data) required for driving the firmware. That is, the memory 230 may serve as a working memory of the processor 220.

The memory 230 may include a data buffer configured to temporarily store write data to be transmitted to the nonvolatile memory device 100 from the host 20 or read data to be transmitted to the host 20 from the nonvolatile memory device 100. That is, the memory 230 may serve as a buffer memory of the processor 220.

The memory 230 may include regions used for various purposes such as a region used as a write data buffer in which write data is to be temporarily stored, a region used as a read data buffer in which read data is to be temporarily stored, and a region used as a map cache buffer in which map data is to be cached.

The memory 230 may store system data as well as meta data.

The memory interface 240 may control the nonvolatile memory device 100 according to control of the processor 220. The memory interface 240 may be referred to as a memory controller. The memory interface 240 may provide control signals to the nonvolatile memory device 100 through a channel. The control signals may include a command, an address, and an operation control signal, and the like for controlling the nonvolatile memory device 100. The memory interface 240 may provide the nonvolatile memory device 100 with data stored in the data buffer or store data transmitted from the nonvolatile memory device 100 in the data buffer.

The host 20 may include a host memory 21. In accordance with an embodiment of the present disclosure, operation performance of the memory system 10 may be improved by using the host memory 21 of the host 20, as described hereinafter.

Figure 2:
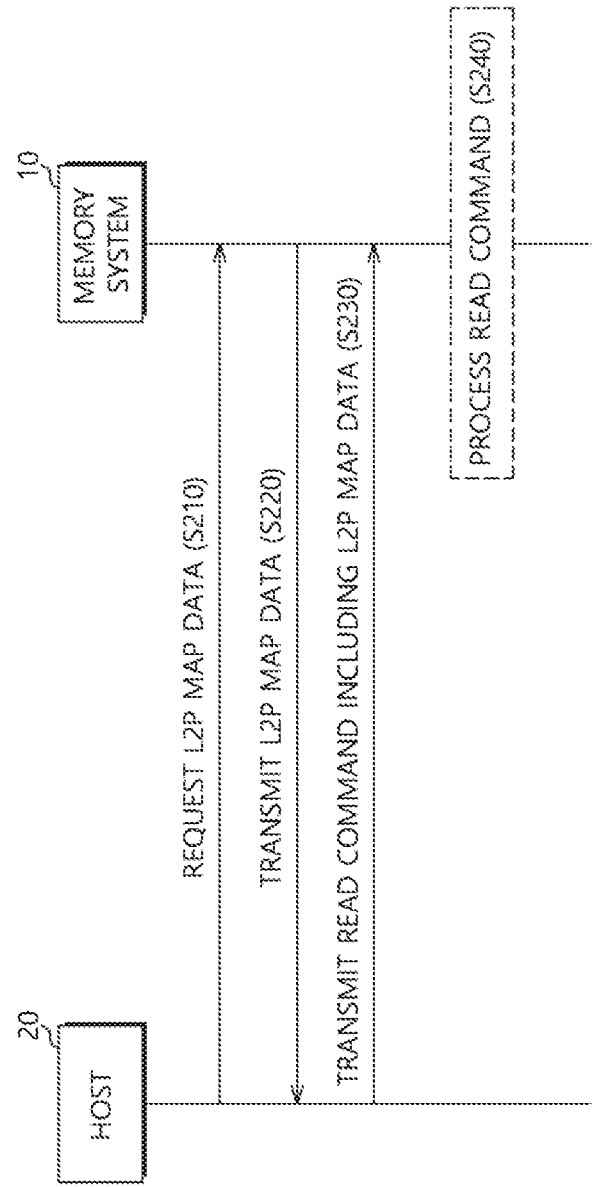
FIG. 2 is a diagram describing a system flow of the memory system using a memory resource of a host, shown in FIG. 1.

FIG. 2 is a diagram describing a system flow of the memory system 10 using a memory resource of host 20, shown in FIG. 1.

Referring to FIG. 2, in step S210, the host 20 may request, from the memory system 10, a whole or a part of a plurality of logical-to-physical (L2P) map data stored in the memory system 10.

The L2P map data may be data indicating a mapping relationship between a logical address used by the host 20 and a physical address used by the controller 200 to access data stored in the nonvolatile memory device 100. The logical address may be a logical page number LPN set on a page basis, a logical block address LBA, and so forth. The physical address may be a physical page number PPN set on a page basis, a physical block address PBN, and so forth.

In an embodiment, the host 20 may request, when a booting operation of the memory system 10 is completed, the L2P map data from the memory system 10.

In an embodiment, the host 20 may request L2P map data corresponding to a specific workload, among a plurality of pieces of L2P map data stored in the memory system 10.

In an embodiment, the host 20 may request a whole or a part of a plurality of pieces of L2P map data stored in the nonvolatile memory device 100.

In an embodiment, the host 20 may request a whole or a part of a plurality of pieces of L2P map data stored in the memory 230 of the controller 200.

In step S220, the memory system 10 may transmit, to the host 20, a whole or a part of L2P map data requested by the host 20.

In an embodiment, the memory 230 of the controller 200 may include a DRAM configured to store a plurality of pieces of L2P map data received from the nonvolatile memory device 100 and an SRAM configured to cache a whole or a part of the plurality of pieces of L2P map data stored in the DRAM.

In an embodiment, the memory system 10 may transmit, to the host 20, a whole or a part of the plurality of pieces of L2P map data stored in the memory 230 of the controller 200.

In an embodiment, the memory system 10 may read a whole or a part of the plurality of pieces of L2P map data stored in the nonvolatile memory device 100, and may transmit the read pieces of L2P map data to the host 20.

The host 20 may receive the L2P map data from the memory system 10, and may cache the received L2P map data into the host memory 21.

In step S230, when data stored in the memory system 10 is required, the host 20 may generate a read command, and may transmit the generated read command to the memory system 10. The read command may include L2P map data for an address which corresponds to the required data, among the L2P map data cached in the host memory 21.

In step S240, the memory system 10 may receive the read command, and may perform a read operation of reading the data stored in the nonvolatile memory device 100 according to the received read command.

In an embodiment, the memory system 10 may read the data stored in the nonvolatile memory device 100 based on the L2P map data included in the read command.

In an embodiment, the memory system 10 may read the data stored in the nonvolatile memory device 100 based on the L2P map data cached in the memory 230 instead of the L2P map data included in the read command.

The memory system 10 may cache the L2P map data into the host memory 21 with a relatively great storage capacity, and may process the read command according to the L2P map data cached in the host memory 21. Therefore, the storage capacity of the memory 230 for caching the L2P map data into the memory system 10 may be saved, and the memory system 10 may be improved in operation performance since there is no need of referring to the L2P map data cached in the memory system 10 when processing the read command.

FIG. 2 has been described with the L2P map data taken as an example. However, the L2P map data may be cached into the host memory 21 by a unit of an L2P map segment including a plurality of pieces of L2P map data.

Figure 3:
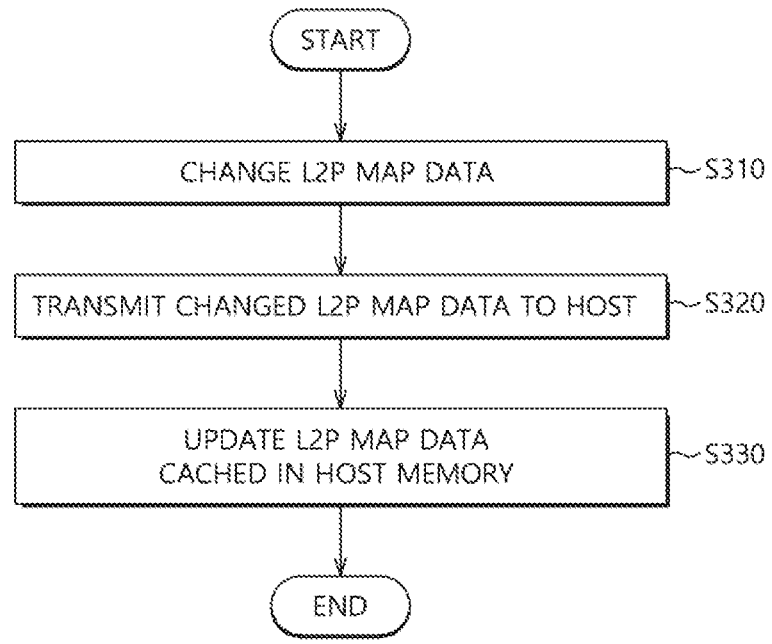
FIGS. 3 and 4 are diagrams describing an operation of the memory system shown in FIG. 1.
Figure 4:
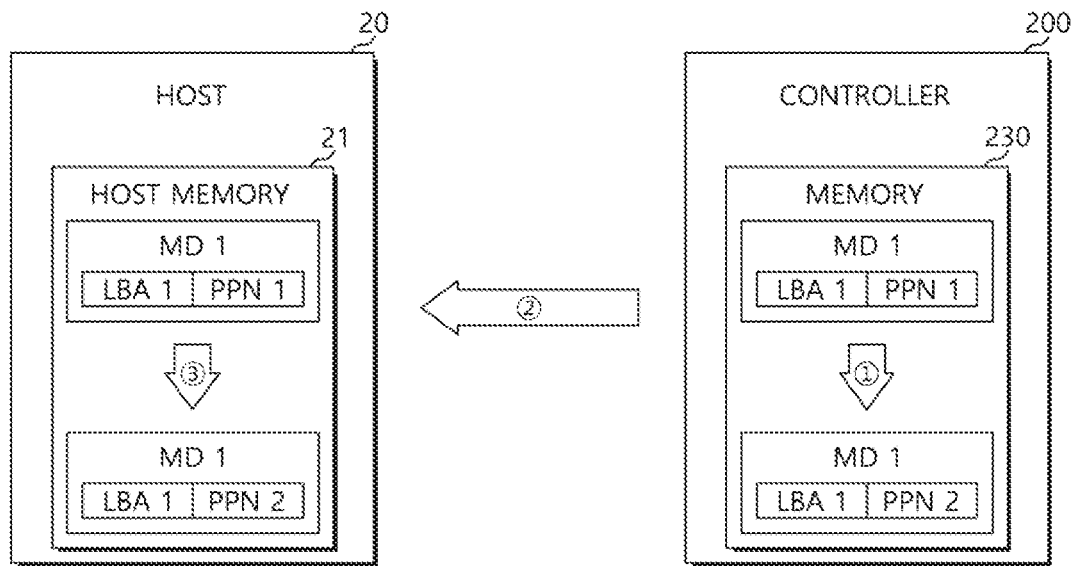

FIGS. 3 and 4 are diagrams describing an operation of the memory system 10 shown in FIG. 1. FIG. 4 illustrates L2P map data MD1 stored in the memory 230 and cached in the host memory 21. The L2P map data MD1 may include a logical block address LBA1 and a physical page number PPN1 mapped to the logical block address LBA1.

Referring to FIGS. 3 and 4, in step S310, the memory system 10 may change the L2P map data MD1 stored in the memory 230. For example, the controller 200 may store data, which is originally stored in a storage location indicated by the physical page number PPN1, into a storage location indicated by a physical page number PPN2 when performing an operation causing an map data changing event, such as a garbage collection operation, a read reclaim operation, data update operation, and so forth. As illustrated in FIG. 4, the mapping relationship of the L2P map data MD1 may change since the physical page number PPN1, which is mapped to the logical block address LBA1 in the L2P map data MD1, is changed to the physical page number PPN2 (①). In this case, since the logical block address LBA1 of the L2P map data MD1 cached in the host memory 21 still has the mapping relationship with the physical page number PPN1, a sync-up operation is required to be performed to synchronize the L2P map data MD1 cached in the host memory 21 to the changed L2P map data MD1 stored in the controller 200.

In an embodiment, the memory system 10 may inform the host 20 of the change of the L2P map data MD1.

In an embodiment, the host 20 may transmit a sync-up request on the L2P map data MD1 cached in the host memory 21, to the memory system 10.

In an embodiment, the host 20 may transmit, when informed of the change of the L2P map data MD1 by the memory system 10, the sync-up request to the memory system 10.

In step S320 the memory system 10 may transmit, when the sync-up request is received from the host 20, the changed L2P map data to the host 20. That is, as illustrated in FIG. 4, the controller 200 may transmit the L2P map data MD1 stored in the memory 230 to the host 20 (②).

In step S330, the host 20 may receive the changed L2P map data MD1 from the controller 200. The host 20 may update the L2P map data MD1 cached in the host memory 21 based on the transmitted L2P map data MD1 (③). That is, the mapping relationship represented by the L2P map data MD1 cached in the host memory 21 may be changed such that the physical page number PPN1 mapped to the logical block address LBA1 is changed to the physical page number PPN2.

FIGS. 3 and 4 have been described with the L2P map data taken as an example. However, the update in the host memory 21 may be performed by a unit of an L2P map segment including a plurality of pieces of L2P map data.

Figure 5:
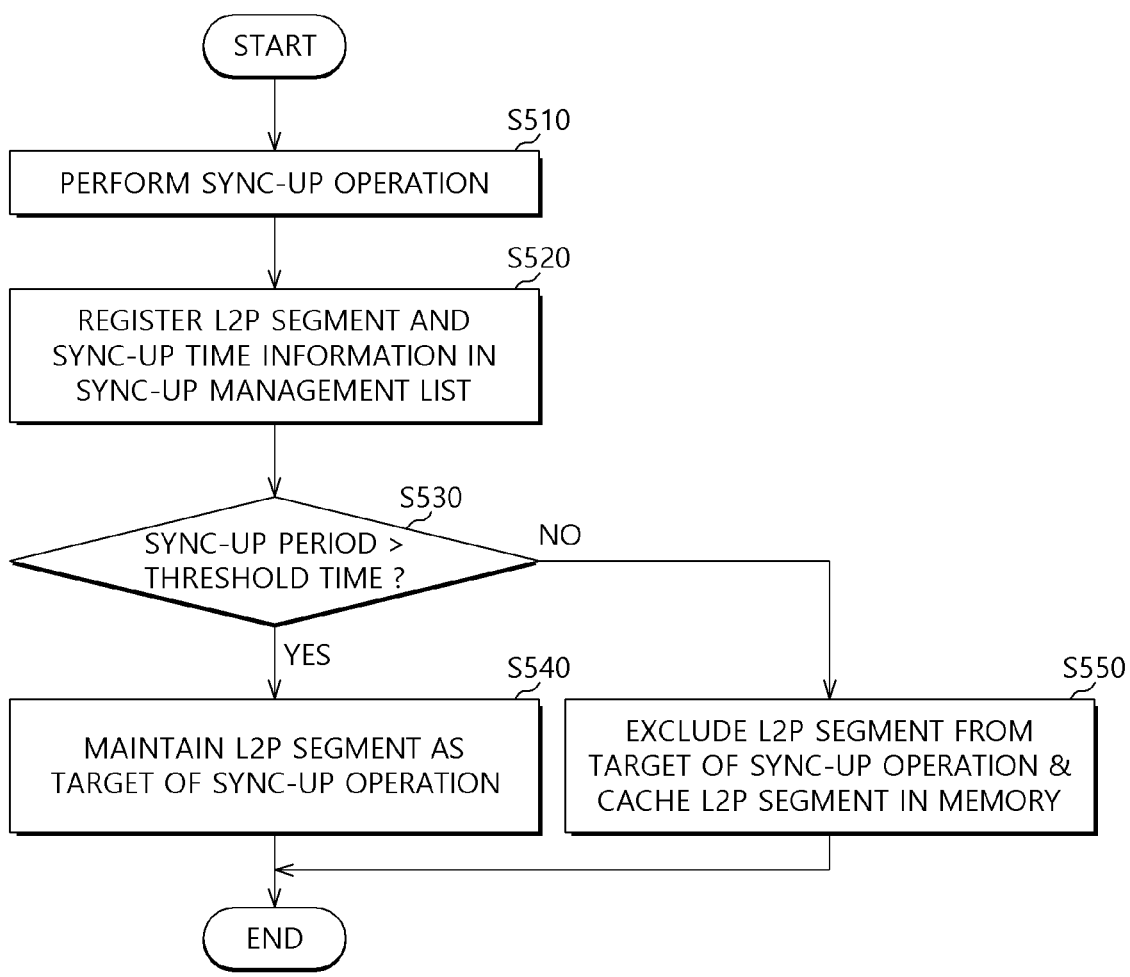
FIG. 5 is a diagram describing an operation of the memory system shown in FIG. 1.

FIG. 5 is a diagram describing an operation of the memory system 10 shown in FIG. 1.

Hereinafter, described will be an operation of a memory system in accordance with an embodiment of the present disclosure based on operations described with reference to FIGS. 2 to 4 are performed by a unit of an L2P map segment including a plurality of pieces of L2P map data.

In step S510, the memory system 10 may perform a sync-up operation. For example, the controller 200 may transmit, when a map data changing event occurs, L2P map segment including changed L2P map data to the host 20. The host 20 may update the L2P map segment, which is already cached in the host memory 21, based on the L2P map segment including the changed L2P map data.

In step S520, the memory system 10 may manage a sync-up management list. For example, the controller 200 may register, in the sync-up management list, the L2P map segment on which a sync-up operation is performed. Also, the controller 200 may register, in the sync-up management list, time information at which a sync-up operation is performed on an L2P map segment registered in the sync-up management list.

In step S530, the memory system 10 may calculate a sync-up period. For example, the controller 200 may calculate, based on the time information registered in the sync-up management list, a time interval between the sync-up operations on the respective L2P map segments, the sync-up period, and so forth. The controller 200 may determine, by comparing the calculated sync-up period with a threshold time, whether the period in which the sync-up operation is performed on each of the L2P map segments is greater than the threshold time.

In an embodiment, the controller 200 may register the calculated sync-up period in the sync-up management list.

In step S540, the memory system 10 may maintain, as a target of a sync-up operation, the L2P map segment registered in the sync-up management list. For example, the controller 200 may maintain, as a target of a sync-up operation, the L2P map segment of which the sync-up period is greater than the threshold time. Therefore, the controller 200 may perform, when the map data changing event occurs, the sync-up operation on the L2P map segment of which the sync-up period is greater than the threshold time.

In an embodiment, the controller 200 may manage the L2P map segment as a target of a sync-up operation (i.e., the L2P map segment on which a sync-up operation is allowed to be performed) in a separate list.

In step S550, the memory system 10 may exclude (i.e., disentitle), from a target of a sync-up operation, the L2P map segment registered in the sync-up management list. For example, the controller 200 may exclude, from a target of a sync-up operation, the L2P map segment of which the sync-up period is equal to or less than the threshold time. This is because too frequent sync-up operations may degrade the operation performance of the memory system 10. The controller 200 may cache, into the memory 230, the L2P map segment of which the sync-up period is equal to or less than the threshold time.

In an embodiment, the controller 200 may manage the L2P map segment, which is excluded from a target of a sync-up operation, in a separate list. In an embodiment, the controller 200 may manage the L2P map segment, which is cached into the memory 230, in a separate list.

In an embodiment, the controller 200 may exclude, when the L2P map segment of which the sync-up period is equal to or less than the threshold time is already cached in the memory 230, the L2P map segment from a target of a cache eviction. In other words, the L2P map segment of which the sync-up period is equal to or less than the threshold time may be kept as cached.

In an embodiment, the controller 200 may manage the L2P map segment, which is excluded from a target of a cache eviction, in a separate list.

When working as a map cache, the memory 230 may cache different L2P map data depending on a workload. In accordance with an embodiment of the present disclosure, L2P map data of which the sync-up period is equal to or less than the threshold time may be kept as cached regardless of the workload.

Therefore, the memory system 10 may not perform a sync-up operation on a frequently changing L2P map segment and thus may prevent degradation thereof in view of operation performance caused by transmission of an L2P map segment to the host 20. Also, the memory system 10 may keep the frequently changing L2P map segment cached in the memory 230, and thus may improve itself in view of read operation performance.

FIG. 5 has been described with a unit of an L2P map segment taken as an example. However, the memory system 10 may operate by a unit of an L2P map data in the substantially same manner as the unit of an L2P map segment, and thus further description about the unit of an L2P map data will be omitted.

Figure 6:
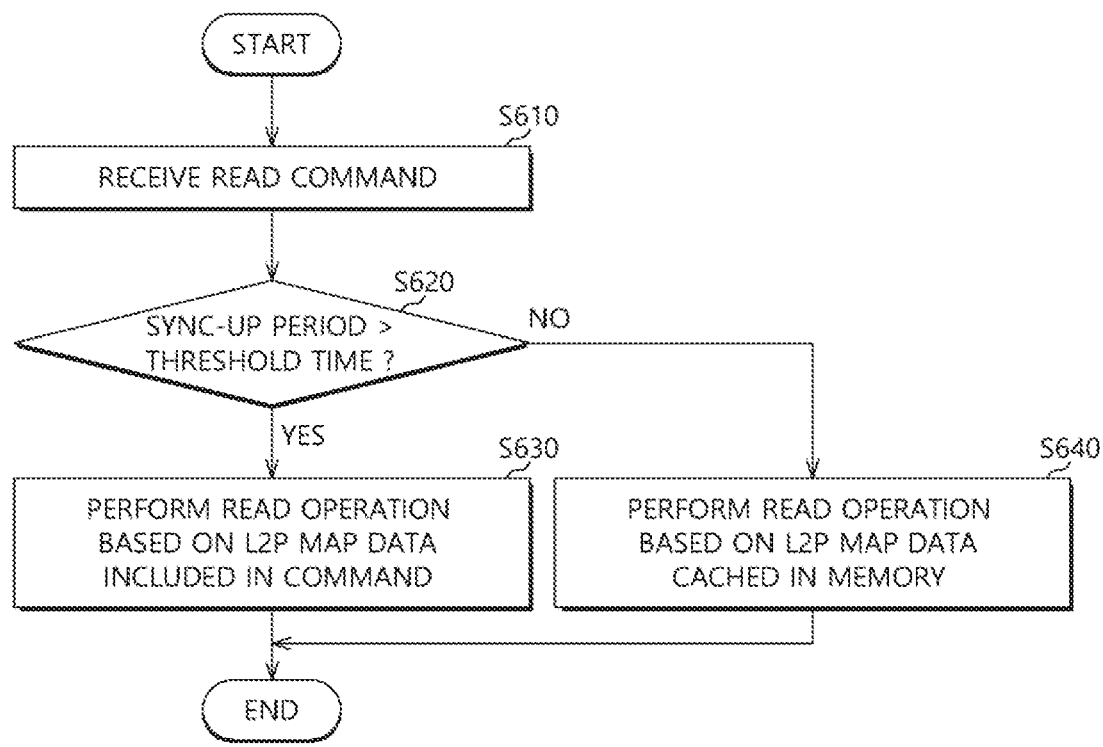
FIG. 6 is a diagram describing an operation of the memory system shown in FIG. 1.

FIG. 6 is a diagram describing an operation of the memory system 10 shown in FIG. 1.

Hereinafter, described will be an operation of a memory system in accordance with an embodiment of the present disclosure based on operations of the memory system 10 described with reference to FIG. 5, are performed.

Referring to FIG. 6, in step S610, the memory system 10 may receive a read command from the host 20. The read command may include L2P map data, cached in the host memory 21, for an address corresponding to read-requested data.

In step S620, the memory system 10 may compare the threshold time with a sync-up period of an L2P map segment corresponding to the read command. For example, the controller 200 may determine whether the sync-up period of the L2P map segment corresponding to the read command is greater than the threshold time. The L2P map segment corresponding to the read command may mean an L2P map segment including L2P map data referred to for processing the read command.

In step S630, the memory system 10 may perform a read operation based on the address included in the read command. For example, the controller 200 may perform, when the sync-up period of the L2P map segment corresponding to the read command is greater than the threshold time, a read operation on the nonvolatile memory device 100 based on the L2P map data, i.e., a physical address, included in the read command.

In step S640, the memory system 10 may perform a read operation based on an L2P map data cached in the memory 230. For example, the controller 200 may control, when the sync-up period of the L2P map segment corresponding to the read command is equal to or less than the threshold time, the nonvolatile memory device 100 to perform a read operation based on a physical address of an L2P map data included in an L2P map segment cached in the memory 230.

Figure 7:
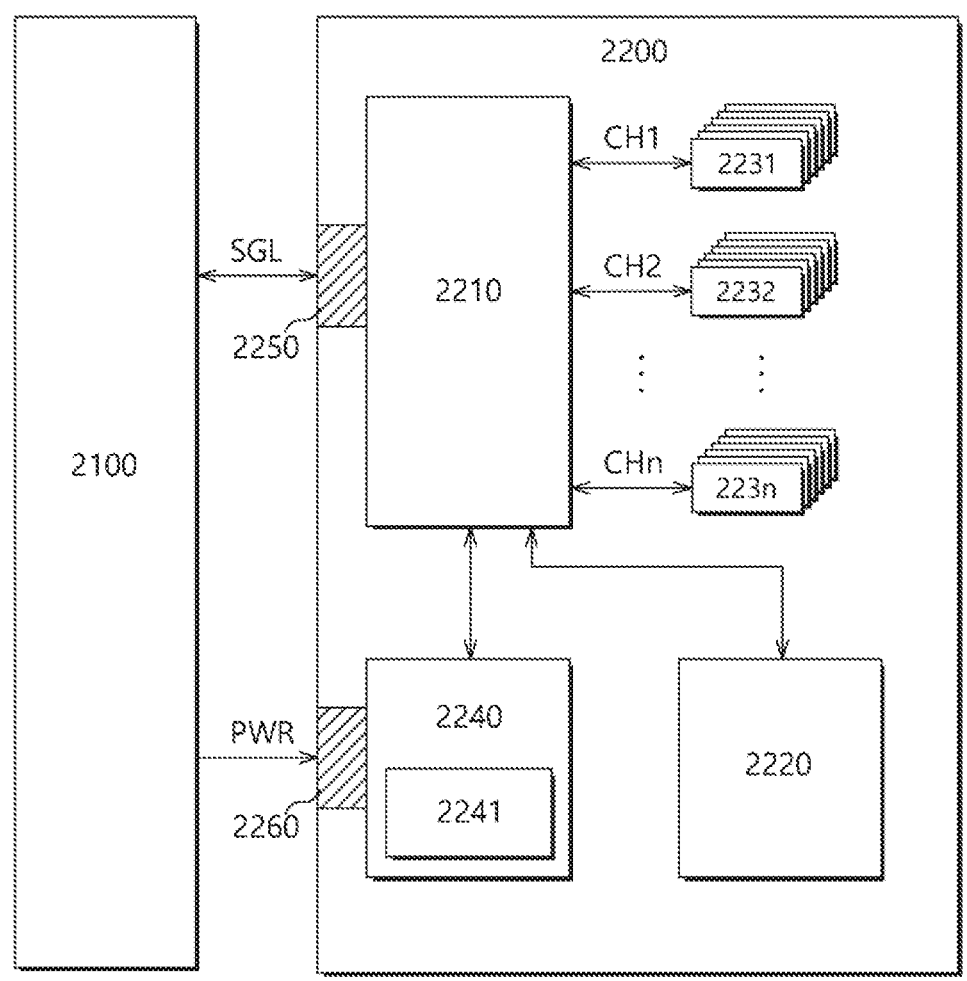
FIG. 7 is a diagram illustrating a data processing system including a solid state drive (SSD) in accordance with an embodiment of the present disclosure.

FIG. 7 is a diagram illustrating a data processing system 2000 including a solid state drive (SSD) 2200 in accordance with an embodiment of the present disclosure. Referring to FIG. 7, the data processing system 2000 may include a host 2100 and the SSD 2200.

The SSD 2200 may include a controller 2210, a buffer memory 2220, nonvolatile memory devices 2231 to 223n, a power supply 2240, a signal connector 2250, and a power connector 2260.

The controller 2210 may control an overall operation of the SSD 2200. The controller 2210 may be implemented and operate in substantially the same way as the controller 100 of FIG. 1.

The buffer memory 2220 may temporarily store data to be stored in the nonvolatile memory devices 2231 to 223n. Further, the buffer memory 2220 may temporarily store data read out from the nonvolatile memory devices 2231 to 223n. The data temporarily stored in the buffer memory 2220 may be transmitted to the host 2100 or the nonvolatile memory devices 2231 to 223n according to control of the controller 2210.

The nonvolatile memory devices 2231 to 223n may be used as storage media of the SSD 2200. The nonvolatile memory devices 2231 to 223n may be electrically coupled to the controller 2210 through a plurality of channels CH1 to CHn, respectively. One or more nonvolatile memory devices may be coupled to a single channel. The nonvolatile memory devices coupled to the single channel may be coupled to the same signal bus and data bus.

The power supply 2240 may provide the inside of the SSD 2200 with power PWR inputted through the power connector 2260. The power supply 2240 may include an auxiliary power supply 2241. The auxiliary power supply 2241 may supply power to allow the SSD 2200 to be normally terminated when sudden power-off (SPO) occurs. The auxiliary power supply 2241 may include large capacity capacitors capable of charging the power PWR.

The controller 2210 may exchange a signal SGL with the host 2100 through the signal connector 2250. The signal SGL may include a command, an address, data, and the like. The signal connector 2250 may be configured with various types of connectors according to an interface scheme between the host 2100 and the SSD 2200.

Figure 8:
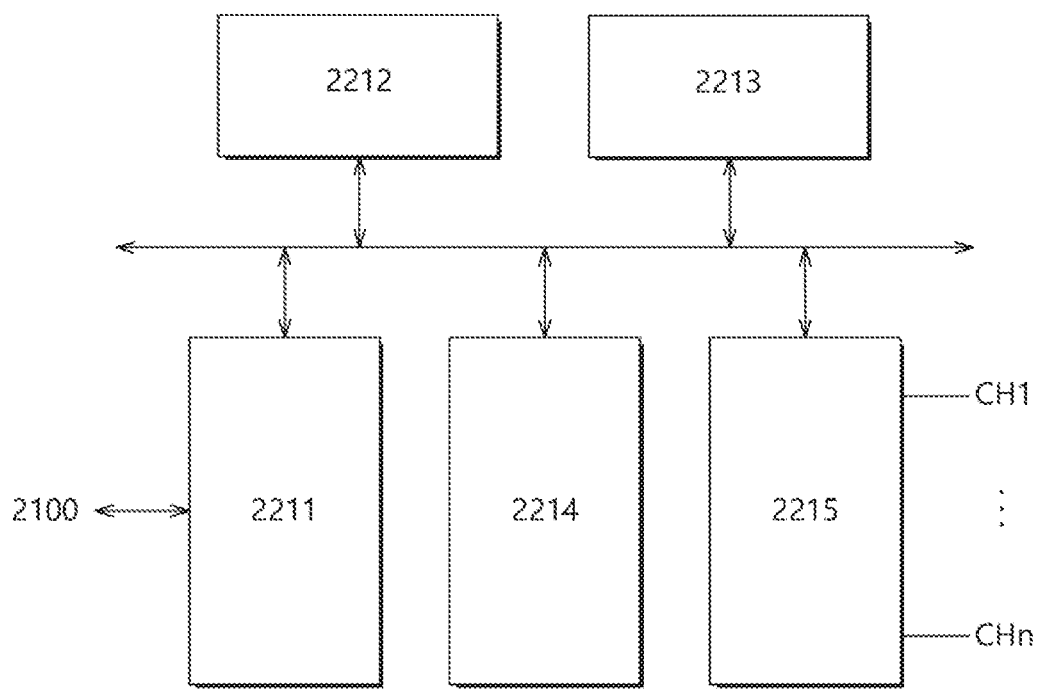
FIG. 8 is a detailed diagram of a controller illustrated in FIG. 7.

FIG. 8 is a detailed diagram of the controller 2210 illustrated in FIG. 7. Referring to FIG. 8, the controller 2210 may include a host interface 2211, a controller 2212, a random access memory (RAM) 2213, an error correction code (ECC) component 2214, and a memory interface 2215.

The host interface 2211 may interface the SSD 2200 with the host 2100 according to a protocol of the host 2100. For example, the host interface 2211 may communicate with the host 2100 through any one among protocols of secure digital (SD), universal serial bus (USB), multi-media card (MMC), embedded MMC (eMMC), personal computer memory card international association (PCMCIA), parallel advanced technology attachment (PATA), serial advanced technology attachment (SATA), small computer system interface (SCSI), serial attached SCSI (SAS), peripheral component interconnection (PCI), PCI Express (PCI-E), universal flash storage (UFS), and so forth. In addition, the host interface nit 2211 may perform a disk emulating function of supporting the host 2100 to recognize the SSD 2200 as a general-purpose memory system, for example, a hard disk drive (HDD).

The controller 2212 may parse and process the signal SGL provided from the host 2100. The controller 2212 may control operations of internal function blocks according to firmware or software for driving the SSD 2200. The random access memory 2213 may operate as a working memory for driving such firmware or software.

The ECC component 2214 may generate parity data of data to be transmitted to the nonvolatile memory devices 2231 to 223n. The generated parity data may be stored, along with the data, in the nonvolatile memory devices 2231 to 223n. The ECC component 2214 may detect errors of data read out from the nonvolatile memory devices 2231 to 223n based on the parity data. When the detected errors are within a correctable range, the ECC component 2214 may correct the detected errors.

The memory interface 2215 may provide control signals such as commands and addresses to the nonvolatile memory devices 2231 to 223n according to control of the controller 2212. The memory interface 2215 may exchange data with the nonvolatile memory devices 2231 to 223n according to control of the controller 2212. For example, the memory interface 2215 may provide data stored in the buffer memory 2220 to the nonvolatile memory devices 2231 to 223n or provide data read out from the nonvolatile memory devices 2231 to 223n to the buffer memory 2220.

Figure 9:
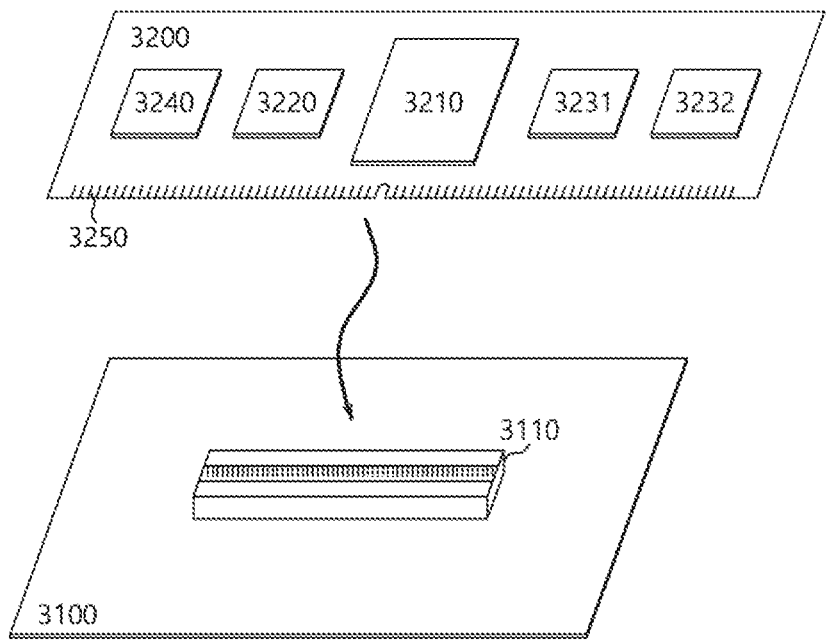
FIG. 9 is a diagram illustrating a data processing system including a memory system in accordance with an embodiment of the present disclosure.

FIG. 9 is a diagram illustrating a data processing system 3000 including a memory system 3200 in accordance with an embodiment of the present disclosure. Referring to FIG. 9, the data processing system 3000 may include a host 3100 and the memory system 3200.

The host 3100 may be configured in the form of a board such as a printed circuit board (PCB). Although not shown in FIG. 9, the host 3100 may include internal function blocks for performing functions of a host.

The host 3100 may include a connection terminal 3110 such as a socket, a slot or a connector. The memory system 3200 may be mounted on the connection terminal 3110.

The memory system 3200 may be configured in the form of a board such as a printed circuit board. The memory system 3200 may be referred to as a memory module or a memory card. The memory system 3200 may include a controller 3210, a buffer memory 3220, nonvolatile memory devices 3231 and 3232, a power management integrated circuit (PMIC) 3240, and a connection terminal 3250.

The controller 3210 may control an overall operation of the memory system 3200. The controller 3210 may be configured in substantially the same manner as the controller 2210 shown in FIG. 8.

The buffer memory 3220 may temporarily store data to be stored in the nonvolatile memory devices 3231 and 3232. Further, the buffer memory 3220 may temporarily store data read out from the nonvolatile memory devices 3231 and 3232. The data temporarily stored in the buffer memory 3220 may be transmitted to the host 3100 or the nonvolatile memory devices 3231 and 3232 according to control of the controller 3210.

The nonvolatile memory devices 3231 and 3232 may be used as storage media of the memory system 3200.

The PMIC 3240 may provide the inside of the memory system 3200 with power inputted through the connection terminal 3250. The PMIC 3240 may manage the power of the memory system 3200 according to control of the controller 3210.

The connection terminal 3250 may be electrically coupled to the connection terminal 3110 of the host 3100. Through the connection terminal 3250, signals such as commands, addresses, data and the like, and power may be transferred between the host 3100 and the memory system 3200. The connection terminal 3250 may be configured as various types depending on an interface scheme between the host 3100 and the memory system 3200. The connection terminal 3250 may be disposed on any one side of the memory system 3200.

Figure 10:
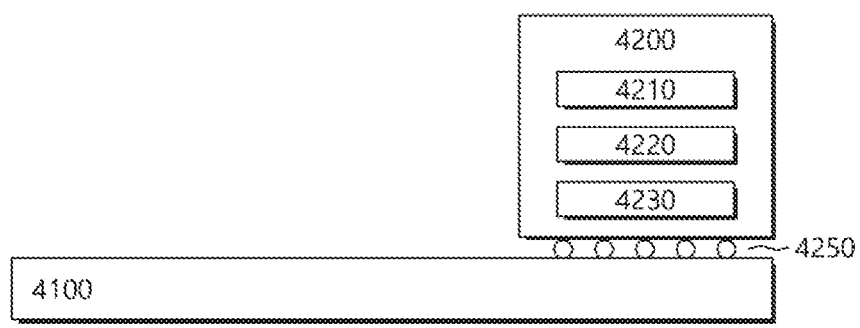
FIG. 10 is a diagram illustrating a data processing system including a memory system in accordance with an embodiment of the present disclosure.

FIG. 10 is a diagram illustrating a data processing system 4000 including a memory system 4200 in accordance with an embodiment of the present disclosure. Referring to FIG. 10, the data processing system 4000 may include a host 4100 and the memory system 4200.

The host 4100 may be configured in the form of a board such as a printed circuit board (PCB). Although not shown in FIG. 10, the host 4100 may include internal function blocks for performing functions of the host.

The memory system 4200 may be configured in the form of a package of a surface-mounting type. The memory system 4200 may be mounted on the host 4100 through solder balls 4250. The memory system 4200 may include a controller 4230, a buffer memory 4220, and a nonvolatile memory device 4210.

The controller 4230 may control an overall operation of the memory system 4200. The controller 4230 may be configured in substantially the same manner as the controller 2210 shown in FIG. 8.

The buffer memory 4220 may temporarily store data to be stored in the nonvolatile memory device 4210. Further, the buffer memory 4220 may temporarily store data read out from the nonvolatile memory device 4210. The data temporarily stored in the buffer memory 4220 may be transmitted to the host 4100 or the nonvolatile memory device 4210 according to control of the controller 4230.

The nonvolatile memory device 4210 may be used as a storage medium of the memory system 4200.

Figure 11:
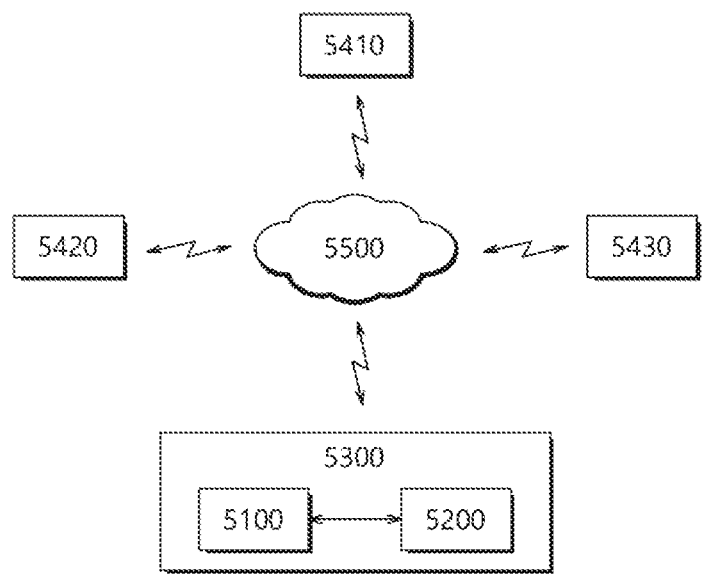
FIG. 11 is a diagram illustrating a network system including a memory system in accordance with an embodiment of the present disclosure.

FIG. 11 is a diagram illustrating a network system 5000 including a memory system 5200 in accordance with an embodiment of the present disclosure. Referring to FIG. 11, the network system 5000 may include a server system 5300 and a plurality of client systems 5410 to 5430 which are electrically coupled to each other through a network 5500.

The server system 5300 may service data in response to requests from the plurality of client systems 5410 to 5430. For example, the server system 5300 may store data provided from the plurality of client systems 5410 to 5430. In another example, the server system 5300 may provide data to the plurality of client systems 5410 to 5430.

The server system 5300 may include a host 5100 and the memory system 5200. The memory system 5200 may be configured by the memory system 10 illustrated in FIG. 1, the memory system 2200 illustrated in FIG. 7, the memory system 3200 illustrated in FIG. 9, or the memory system 4200 illustrated in FIG. 10.

Figure 12:
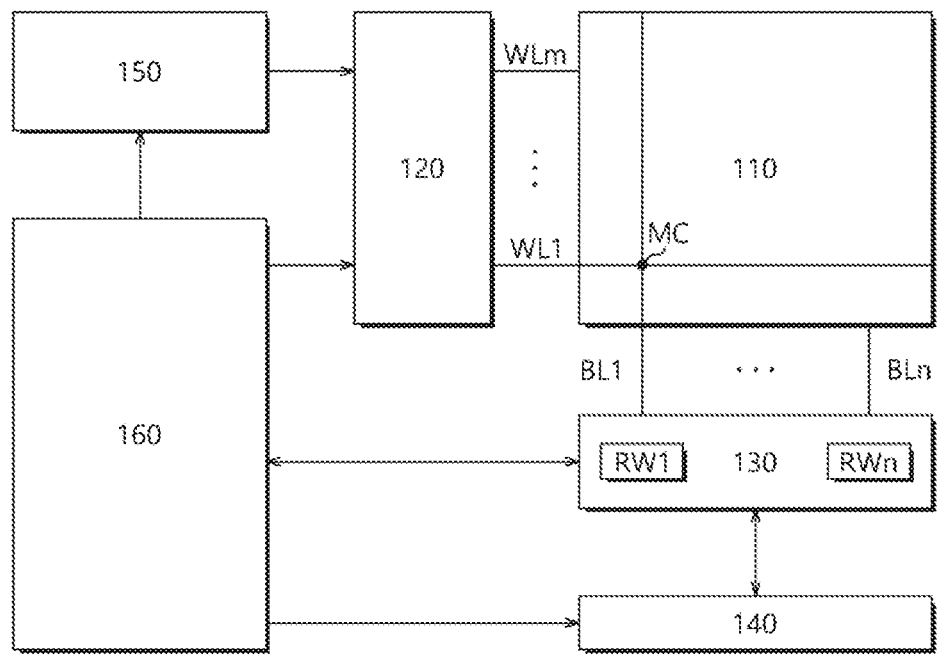
FIG. 12 is a detailed diagram of the nonvolatile memory device shown in FIG. 1.

FIG. 12 is a detailed diagram of the nonvolatile memory device 100 shown in FIG. 1. Referring to FIG. 12, the nonvolatile memory device 100 may include a memory cell array 110, a row decoder 120, a column decoder 130, a data read/write block 140, a voltage generator 150, and a control logic 160.

The memory cell array 110 may include memory cells MC arranged at cross points between word lines WL1 to WLm and bit lines BL1 to BLn.

The row decoder 120 may be coupled with the memory cell array 110 through the word lines WL1 to WLm. The row decoder 120 may operate according to control of the control logic 160. The row decoder 120 may decode an address provided from an external device (not shown). The row decoder 120 may select and drive the word lines WL1 to WLm based on a decoding result. For instance, the row decoder 120 may provide the word lines WL1 to WLm with a word line voltage provided from the voltage generator 150.

The data read/write block 140 may be coupled with the memory cell array 110 through the bit lines BL1 to BLn. The data read/write block 140 may include read/write circuits RW1 to RWn respectively corresponding to the bit lines BL1 to BLn. The data read/write block 140 may operate according to control of the control logic 160. The data read/write block 140 may operate as a write driver or a sense amplifier according to an operation mode. For example, the data read/write block 140 may operate as a write driver configured to store data provided from the external device in the memory cell array 110 during a write operation. For another example, the data read/write block 140 may operate as a sense amplifier configured to read out data from the memory cell array 110 during a read operation.

The column decoder 130 may operate according to control of the control logic 160. The column decoder 130 may decode an address provided from the external device. Based on a decoding result, the column decoder 130 may couple the read/write circuits RW1 to RWn of the data read/write block 140, which respectively correspond to the bit lines BL1 to BLn, with data input/output lines or data input/output buffers.

The voltage generator 150 may generate voltages to be used in internal operations of the nonvolatile memory device 100. The voltages generated by the voltage generator 150 may be applied to the memory cells of the memory cell array 110. For example, a program voltage generated during a program operation may be applied to a word line of memory cells for which the program operation is to be performed. For another example, an erase voltage generated during an erase operation may be applied to a well area of memory cells for which the erase operation is to be performed. For still another example, a read voltage generated during a read operation may be applied to a word line of memory cells for which the read operation is to be performed.

The control logic 160 may control general operations of the nonvolatile memory device 100 based on control signals provided from the external device. For example, the control logic 160 may control operations of the nonvolatile memory device 100 such as read, write and erase operations of the nonvolatile memory device 100.

While certain embodiments have been described above, it will be understood to those skilled in the art that the embodiments described are by way of example only. Accordingly, the controller, memory system and operating method thereof should not be limited based on the described embodiments. Rather, the controller, memory system and operating method thereof described herein should only be limited in light of the claims that follow when taken in conjunction with the above description and accompanying drawings.

What is claimed is:

1. A controller for controlling a nonvolatile memory device, the controller configured to:
perform a sync-up operation of transmitting a logical-to-physical (L2P) map segment to a host to update the L2P map segment stored in a host memory included in the host when a map data changing event occurs,
register the L2P map segment transmitted to the host and time information at which the sync-up operation is performed in a sync-up management list,
calculate a sync-up period based on the time information, and
perform the sync-up operation on an L2P map segment having a sync-up period greater than a threshold time, among L2P map segments registered in the sync-up management list,
wherein the controller is configured to exclude, from a target of the sync-up operation, a first L2P map segment having the sync-up period equal to or less than the threshold time, among the L2P map segments registered in the sync-up management list.

2. The controller of claim 1, wherein the controller is configured to cache the first L2P map segment into a memory of the controller.

3. The controller of claim 2, wherein the controller is configured to exclude the first L2P map segment from a target of a cache eviction when the first L2P map segment is already cached in the memory.

4. The controller of claim 2, wherein the controller is configured to perform, when a read command received from the host corresponds to the first L2P map segment, a read operation on the nonvolatile memory device based on the first L2P map segment cached in the memory.

5. The controller of claim 1, wherein the controller is configured to perform, when a read command received from the host corresponds to the L2P map segment having the sync-up period greater than the threshold time, a read operation on the nonvolatile memory device based on L2P map data included in the read command.

6. The controller of claim 1, wherein the map data changing event is an event where at least one mapping relationship between a logical address and a physical address changes among a plurality of pieces of L2P map data included in the L2P map segment transmitted to the host.

7. The controller of claim 1, wherein the map data changing event is at least one of an update operation, a garbage collection operation, and a read reclaim operation on data corresponding to the L2P map segment transmitted to the host.

8. A memory system comprising:
a nonvolatile memory device; and
a controller for controlling the nonvolatile memory device,
wherein the nonvolatile memory device is configured to store a plurality of logical-to-physical (L2P) map segments each including a plurality of pieces of L2P map data,
wherein the controller is configured to perform a sync-up operation of transmitting an L2P map segment to a host to update the L2P map segment stored in a host memory included in the host when a map data changing event occurs, register the L2P map segment transmitted to the host and time information at which the sync-up operation is performed, in a sync-up management list, calculate a sync-up period based on the time information, and perform the sync-up operation on an L2P map segment having the sync-up period greater than a threshold time, among L2P map segments registered in the sync-up management list, and
wherein the controller is configured to exclude, from a target of the sync-up operation, a first L2P map segment having the sync-up period equal to or less than the threshold time, among the L2P map segments registered in the sync-up management list.

9. The memory system of claim 8, wherein the controller is configured to cache the first L2P map segment into a memory of the controller.

10. The memory system of claim 9, wherein the controller is configured to exclude the first L2P map segment from a target of a cache eviction when the first L2P map segment is already cached in the memory.

11. The memory system of claim 9, wherein the controller is configured to perform, when a read command received from the host corresponds to the first L2P map segment, a read operation on the nonvolatile memory device based on the first L2P map segment cached in the memory.

12. The memory system of claim 8, wherein the controller is configured to perform, when a read command received from the host corresponds to the L2P map segment having the sync-up period greater than the threshold time, a read operation on the nonvolatile memory device based on L2P map data included in the read command.

13. The memory system of claim 8, wherein the map data changing event is when at least one mapping relationship between a logical address and a physical address changes among a plurality of pieces of L2P map data included in the L2P map segment transmitted to the host.

14. The memory system of claim 8, wherein the map data changing event is at least one of an update operation, a garbage collection operation, and a read reclaim operation on data corresponding to the L2P map segment transmitted to the host.

15. An operation method of a memory system including a nonvolatile memory device and a controller for controlling the nonvolatile memory device, the method comprising:
storing, by the nonvolatile memory device, a plurality of logical-to-physical (L2P) map segments each including a plurality of pieces of L2P map data;
performing, by the controller, a sync-up operation of transmitting an L2P map segment to a host to update the L2P map segment stored in a host memory included in the host when a map data changing event occurs;
registering, by the controller, the L2P map segment transmitted to the host and time information at which the sync-up operation is performed in a sync-up management list;
calculating, by the controller, a sync-up period based on the time information;
performing, by the controller, the sync-up operation on an L2P map segment having the sync-up period greater than a threshold time, among L2P map segments registered in the sync-up management list;
excluding, by the controller, from a target of the sync-up operation, a first L2P map segment having the sync-up period equal to or less than the threshold time, among the L2P map segments registered in the sync-up management list; and
caching, by the controller, the first L2P map segment into a memory of the controller.

16. The operation method of claim 15, further comprising:
performing, by the controller, when a read command received from the host corresponds to the first L2P map segment, a read operation on the nonvolatile memory device based on the first L2P map segment cached in the memory.

17. The operation method of claim 15, further comprising:
performing, by the controller, when a read command received from the host corresponds to the L2P map segment having the sync-up period greater than the threshold time, a read operation on the nonvolatile memory device based on L2P map data included in the read command.

* * * * *